G. FRITZ.
NOODLE-MACHINE.

No. 185,910. Patented Jan. 2, 1877.

Witnesses.

Inventor.
Gottlob Fritz
by his attorney

UNITED STATES PATENT OFFICE.

GOTTLOB FRITZ, OF CINCINNATI, OHIO, ASSIGNOR OF ONE-HALF HIS RIGHT TO MICHAEL BUTZ, OF SAME PLACE.

IMPROVEMENT IN NOODLE-MACHINES.

Specification forming part of Letters Patent No. 185,910, dated January 2, 1877; application filed October 13, 1876.

*To all whom it may concern:*

Be it known that I, GOTTLOB FRITZ, of Cincinnati, in the county of Hamilton and State of Ohio, have invented a certain Improvement in Machines for Cutting Noodles, of which the following is a specification:

My invention relates to a machine for cutting noodles, embodying in its construction certain mechanical elements, the principal ones of which may be enumerated as follows: a parallel-sided trough of about the width of the sheet of dough to be cut up into narrow strips, technically termed "noodles;" a pair of feed-rolls for advancing the sheet of dough to the cutter, one of the rolls being hung in a pivoted frame acted upon by a spring or springs; a reciprocating knife or cutter, arranged to operate in front of the feed-rolls, and in conjunction with the front edge of a fixed plate; mechanism for imparting a reciprocating motion to the knife or cutter; mechanism for revolving the feed-rolls.

My improvement has reference to the feed mechanism, and will be clearly pointed out by the claim at the end of this specification.

Figure 1:
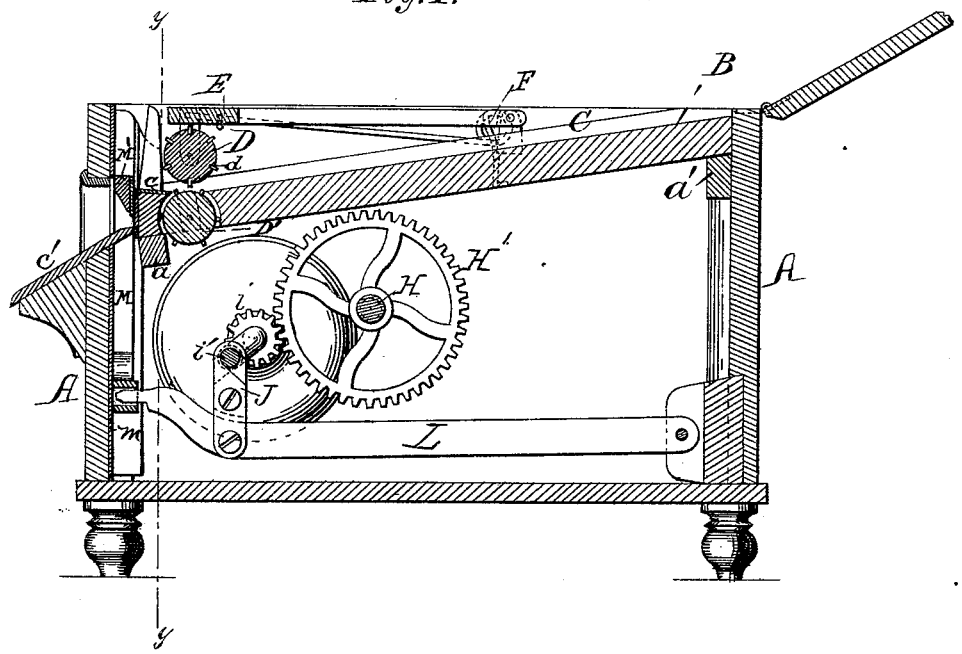
Figure 3:
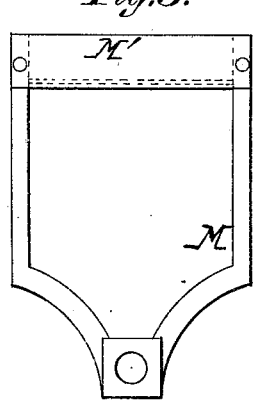
Figures 2, 4:
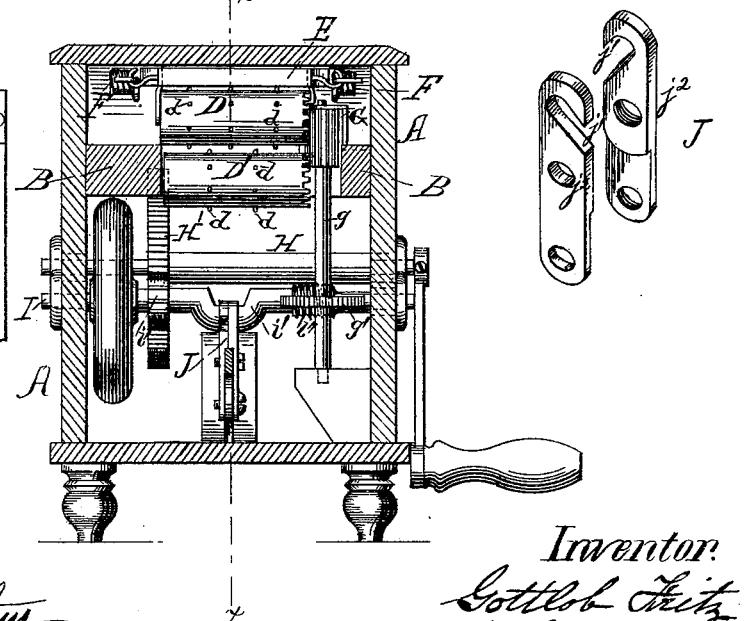

In the annexed drawings, Figure 1 is a central vertical section of my invention on the line $x\,x$, Fig. 2. Fig. 2 is a vertical transverse section on the line $y\,y$, Fig. 1. Fig. 3 is a detail view of the knife or cutter. Fig. 4 is a detail perspective view of the parts of the pitman.

The same letters of reference are used in the several figures in the designation of identical parts.

The machine as exemplified is more especially intended for family and hotel use, and for that reason mainly the several operative parts are arranged in a suitable box or case, A. B is an inclined surface, which rests on the pieces $a\,a'$, which are, respectively, fastened to the front and rear of the interior of the box or case. In the center of this incline is a wide groove or depression, C, which forms a parallel-sided trough, by which the dough is guided to the feed-rolls D D', the width of the trough being about the same as the width of the sheet of dough to be cut up.

It will be understood that to feed a material so plastic and of such loose texture and shortness as dough with any degree of evenness, is a pretty difficult problem. The parallel sides of the trough, serving as guides to the edges of the sheet of dough to be cut up, aid toward a proper feed, and the use of a parallel-sided trough greatly contributes, for this reason, to make my machine as a whole practically adapted for the purpose intended. The end of the bottom of the trough adjacent to the feed-rolls is undercut or beveled on the under side, so that it may support the dough as near up to the bite of the rolls as possible.

The upper feed-roll D is journaled in the frame E, pivoted at its rear end. Springs F are used to depress the free end of the frame, to press the feed-roll D toward the under feed-roll D'.

These springs may be disconnected from the frame E, so that the latter may be raised in order to clean the rolls after using the machine.

The under feed-roll D' has its upper surface on a level with the surface of the trough. Both the feed-rolls are provided on their surface with small projections or pins $d$, which enable them to better feed the dough. Upon one end the feed-rolls D D' have teeth or cogs, which stand parallel to their axes, and mesh into a lantern-wheel, G, secured upon an upright shaft, $g$, the lower end of which turns in a step secured to the side of the case.

It will be observed that the wheel G will permit the feed-roll D to move up and down without causing a disengagement of their respective teeth or cogs, and that the cogs will mesh smoothly under all conditions.

The shaft of the lantern-wheel G has a worm-wheel, $g'$, which is driven by a worm, $i^2$, on the counter-shaft I, which receives motion, through gearing H' $i^1$, from the driving-shaft H. The cutter-blade M' is secured to the sash or frame M, arranged in vertical grooves $m$ in front of the feed-rolls, to operate in connection with the bar or plate $c$, as before stated. The bar $c$ is arranged directly in front of the feed-rolls, and its edge, adjacent thereto, is formed like the bottom of the trough on the other side of the rolls, so that it also will be in close contiguity to the bite of the rolls, and thus effectively provide for the passage of the dough to the knife.

It is obvious that were any considerable space left between this plate and the rolls, the dough, by reason of its flexibility, would pass down in front, instead of over this plate.

The blade is disposed somewhat obliquely to cut with a shear-cut. The sash M is reciprocated by the lever L, oscillated by the crank $i^1$ through the pitman J. In this instance the pitman consists of two bars pivoted together at $j^2$. Reverse oblique slots $j^1$ are formed in the respective bars of the pitman, with semicircular terminations, so that when the bars are closed to stand parallel to each other, a circular eye is formed for the reception and retention of the crank, as shown in Fig. 1.

The pitman thus constructed can be very readily connected to and detached from the cranked portion of the shaft. The pin connecting it to the lever L maintains the two bars of the pitman in rigidity. The shaft H is provided with a winch, by which the machine is operated.

The dough being rolled out until quite thin, in sheets of a suitable size, they are rolled up and placed in the trough C, and the end of the roll is introduced between the feed-rolls. The winch being turned, the cog-wheel H' operating the pinion $i^1$ on the shaft I, a reciprocating motion is imparted to the knife-frame by means of the pitman J and arm L. The worm $i^2$ on the shaft I at the same time drives the worm-wheel $g'$ and turns the shaft $g$ and lantern-wheel G, causing the feed-rolls D and D' to slowly feed the dough under the knife, by which it is cut into narrow strips, which are discharged over the chute $c'$.

Having thus fully described my invention, what I claim as new, and desire to secure by Letters Patent, is—

In a noodle-machine, the combination, substantially as specified, with the feed-rolls, of the lantern-wheel G, mounted upon the vertical shaft $g$, said feed-rolls being provided with teeth, which are formed directly in the body of said rolls and parallel with the axis thereof.

In testimony whereof I have signed my name to the foregoing specification in the presence of two subscribing witnesses.

GOTTLOB FRITZ.

Witnesses:
G. C. MILLER,
H. C. PETERS.